United States Patent
Hsu et al.

(10) Patent No.: US 10,666,676 B1
(45) Date of Patent: May 26, 2020

(54) DETECTION OF TARGETED EMAIL ATTACKS

(71) Applicant: Trend Micro Incorporated, Tokyo (JP)

(72) Inventors: Ching-Cheng Hsu, Taipei (TW); Hsun-Jen Hsu, Taipei (TW); I-Ting Lien, Taipei (TW); Cheng-Han Lin, Taipei (TW); Ching-Ming Lin, Taipei (TW); Yin-Liang Wang, Taipei (TW); Cheng-Han Wu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 577 days.

(21) Appl. No.: 14/461,688

(22) Filed: Aug. 18, 2014

(51) Int. Cl.
*H04L 29/06* (2006.01)
*H04L 12/58* (2006.01)
*H04L 12/28* (2006.01)

(52) U.S. Cl.
CPC ................. *H04L 63/1441* (2013.01)

(58) Field of Classification Search
CPC ............ H04L 63/1441; H04L 63/1425; H04L 63/1483; H04L 67/327; H04L 63/14; H04L 12/5885; H04L 51/34; H04L 63/1416; H04L 51/12; G06N 20/00; G06Q 10/107
See application file for complete search history.

(56) References Cited

U.S. PATENT DOCUMENTS

| | | | | |
|---|---|---|---|---|
| 8,407,785 B2* | 3/2013 | Sidiroglou | ............ | H04L 12/585 726/22 |
| 8,984,640 B1* | 3/2015 | Emigh | ................ | H04L 63/1441 726/13 |
| 9,686,308 B1* | 6/2017 | Srivastava | .............. | H04L 51/12 |
| 2005/0198173 A1* | 9/2005 | Evans | ...................... | H04L 51/12 709/206 |
| 2007/0038705 A1* | 2/2007 | Chickering | ............. | H04L 51/12 709/206 |
| 2007/0079379 A1* | 4/2007 | Sprosts | ................ | G06Q 10/107 726/24 |
| 2007/0192855 A1* | 8/2007 | Hulten | .............. | G06F 17/30887 726/22 |
| 2007/0192863 A1* | 8/2007 | Kapoor | ................... | G06F 9/505 726/23 |

(Continued)

OTHER PUBLICATIONS

Meizhen, Wang, Li Zhitang, and Zhong Sheng. "A method for spam behavior recognition based on fuzzy decision tree." 2009 Ninth IEEE International Conference on Computer and Information Technology. vol. 2. IEEE, 2009. (Year: 2009).*

(Continued)

*Primary Examiner* — Michael Simitoski

(74) *Attorney, Agent, or Firm* — Okamoto & Benedicto LLP

(57) ABSTRACT

Targeted email attacks are detected using feature combinations of known abnormal emails, interflow shapes formed by an email with other emails, or both. An email received in an endpoint computer system is scanned to identify abnormal features indicative of a targeted email attack and the abnormal features of the email are checked against abnormal feature combinations. The email can also be scanned to identify an interflow shape formed by the email with other emails and the interflow shape is checked against interflow shapes of known targeted email attacks.

2 Claims, 12 Drawing Sheets

(56) References Cited

U.S. PATENT DOCUMENTS

| | | | | |
|---|---|---|---|---|
| 2010/0121631 A1* | 5/2010 | Bonnet | ............... | G06F 17/2715 704/9 |
| 2010/0235879 A1* | 9/2010 | Burnside | ............. | H04L 63/0263 726/1 |
| 2011/0173142 A1* | 7/2011 | Dasgupta | ............... | G06N 20/00 706/12 |
| 2011/0179487 A1* | 7/2011 | Lee | ....................... | H04L 12/585 726/23 |
| 2012/0324580 A1* | 12/2012 | Glasser | ................... | H04L 51/12 726/24 |
| 2013/0254895 A1* | 9/2013 | Neil | .................... | H04L 63/1425 726/25 |
| 2014/0230060 A1* | 8/2014 | Higbee | ............... | H04L 63/1483 726/24 |
| 2015/0264063 A1* | 9/2015 | Jenson | ................ | H04L 63/1408 726/22 |
| 2015/0281156 A1* | 10/2015 | Beausoleil | ............ | H04L 51/14 709/206 |
| 2018/0124085 A1* | 5/2018 | Frayman | ................ | G06N 20/20 |

OTHER PUBLICATIONS

Detect and Deflect Targeted Attacks and Zero-Day Threats with Cisco Outbreak Filters, 2013, 7 sheets, Cisco White Paper.

FireEye Scales Threat Protection Management with New Release; Bolsters Email Threat Protection and Operational Readiness, Jan. 30, 2014 FireEye Press Release, 4 sheets.

Email Security (FireEye Ex Series), 2006-2014 Datasheet Ex Series, 3 sheets.

Proofpoint > Targeted Attack Protection, 2014, 3 sheets, Proofpoint, Inc.

Rohan Mahesh Amin "Detecting Targeted Malicious Email Through Supervised Classification of Persistent Threat and Recipient Oriented Features", Jan. 31, 2011, pp. 1-180, A Dissertion submitted to the Faculty of the School of Engineering and Applied Sciences or the George Washington University.

* cited by examiner

| Trained combinations | Feature scanning priority | Tree construction |
|---|---|---|
| { Feature1, Feature3}<br>{ Feature1, Feature4}<br>{ Feature2, Feature5} | Feature1 : 3<br>Feature2 : 2<br>Feature3 : 2<br>Feature4 : 1<br>Feature5 : 1 | F1 |
| {[Feature1,]Feature3}<br>{[Feature1,]Feature4}<br>{ Feature2, Feature5} | Feature3 : 2<br>Feature4 : 1 | detected F1 — F3 |
| {[Feature1,]Feature3]}<br>{[Feature1,]Feature4}<br>{ Feature2, Feature5} | Feature4 : 1 | F1 — F3 — F4 undetected |
| { Feature1, Feature3}<br>{ Feature1, Feature4}<br>{ Feature2, Feature5} | Feature2 : 2<br>Feature5 : 1 | F1 undetected, F3, F2, F4 |
| { Feature1, Feature3}<br>{ Feature1, Feature4}<br>{[Feature2,]Feature5} | Feature5 : 1 | F1 undetected, F3, F2, F4, F5 detected |

| Suspicious Attachments, Links, and Email Characteristics | | | | | |
|---|---|---|---|---|---|
| Attachment | File Type | Risk Level | Detection | Size (bytes) | SHA-1 |
| Package.zip | ZIP | High | - | 12,812 | F3D40808198A3AE6D6D1CCA62DF8893DC2 A7GH11 |
| Report.pdf (extracted) | PDF | High | - | 38,982 | B1E3080B198A3AE6D6D1CCA62DF8893DC2 A7AD43 |

| Link | Displayed Text | | | Risk Level | Category |
|---|---|---|---|---|---|
| 12.30.99.129/help.js | Contact Us | | | High | - |

| Email Characteristics | Detail Description | | | Risk Level | |
|---|---|---|---|---|---|
| Mail routing path contains poor reputated mail server | Mail routing path contains poor reputated mail server 209.219.136.196(US) & | | | High | |
| Significant time gap during mail transit | Significant time gap (>30.0 minutes) during mail transit between hops msr6.hinet.net spamdb.afa.gov.tw from time Tue, 8 May 2012 14:40:23 +0800 to Tue, 8 May 2012 16:04:43 +0800 | | | | |
| Inconsistent recipient accounts | Envelope recipient dukehung@mail.afa.gov.tw unconforms to header recipient hciee@mail.afa.gov.tw | | | | |
| Possible forged sender account or an unexpected relay/forward | Possible forged sender account tracy@mail.coa.gov.tw sending from host msr6.hinet.net (or unexpected server-side relay/forward) | | | | |

*View screen shot with suspicious point highlighted*

DETECTION OF TARGETED EMAIL ATTACKS

BACKGROUND OF THE INVENTION

1. Field of the Invention

The present invention relates generally to computer security, and more particularly but not exclusively to systems and methods for detecting targeted email attacks.

2. Description of the Background Art

As its name implies, a targeted email attack is a computer attack that is designed for a particular target, which is usually a particular organization. Unlike other computer attacks that are initiated by email, a targeted email attack is designed to appear as a normal, i.e., legitimate, email that is typically received by the target. Targeted email attacks are relatively difficult to detect because they have characteristics that are more in common with normal emails than abnormal emails. Conventional signature matching and heuristic algorithms are thus relatively ineffective against targeted email attacks.

SUMMARY

In one embodiment, targeted email attacks are detected using feature combinations of known abnormal emails, interflow shapes formed by an email with other emails, or both. An email received in an endpoint computer system is scanned to identify abnormal features indicative of a targeted email attack and the abnormal features of the email are checked against abnormal feature combinations. The email can also be scanned to identify an interflow shape formed by the email with other emails and the interflow shape is checked against interflow shapes of known targeted email attacks.

These and other features of the present invention will be readily apparent to persons of ordinary skill in the art upon reading the entirety of this disclosure, which includes the accompanying drawings and claims.

DESCRIPTION OF THE DRAWINGS

FIG. 6 shows an example of a traverse tree in accordance with an embodiment of the present invention.

FIG. 11 shows an example report generated by a targeted attack detector in accordance with an embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
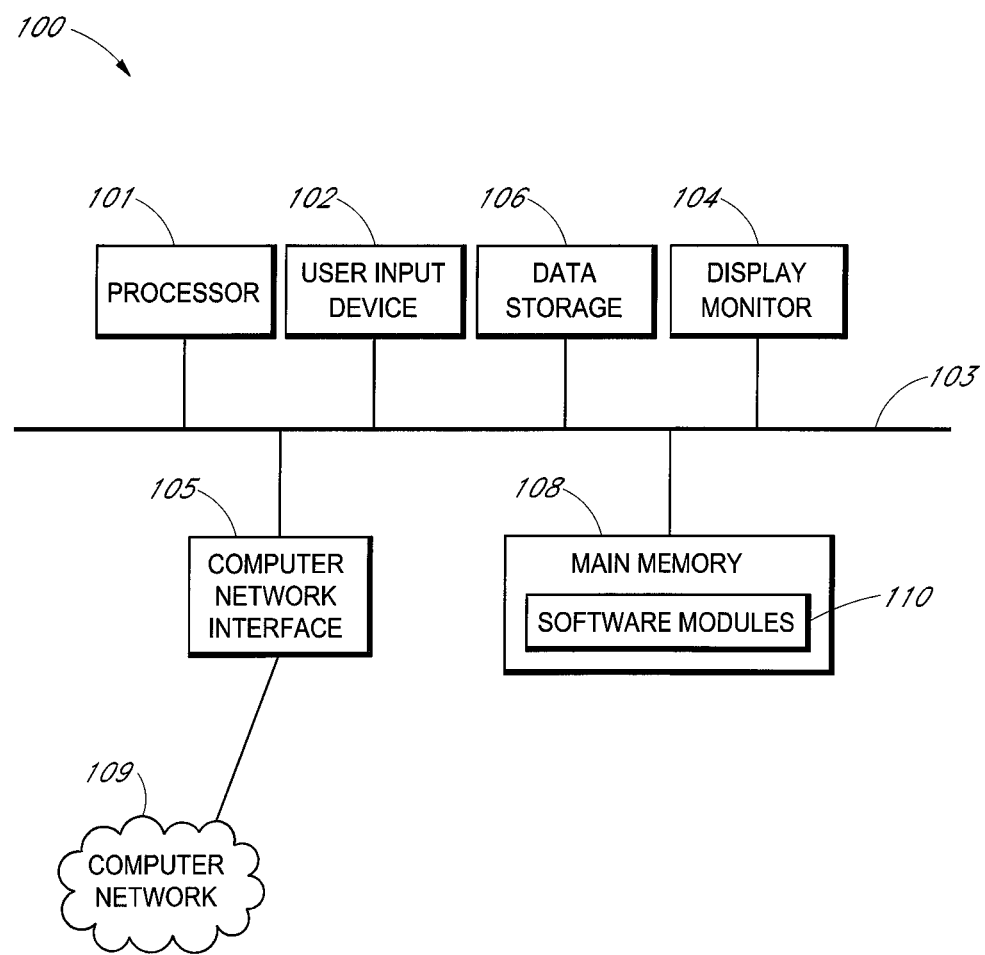
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a backend system or an endpoint system, for example. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a targeted attack detector, antivirus module, anti-spam module, a sandbox module, and a Uniform Resource Locator (URL) filter when the computer 100 is configured as an endpoint system. As another example, the software modules 110 may comprise a targeted attack detector generation module when the computer 100 is employed as a backend system.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
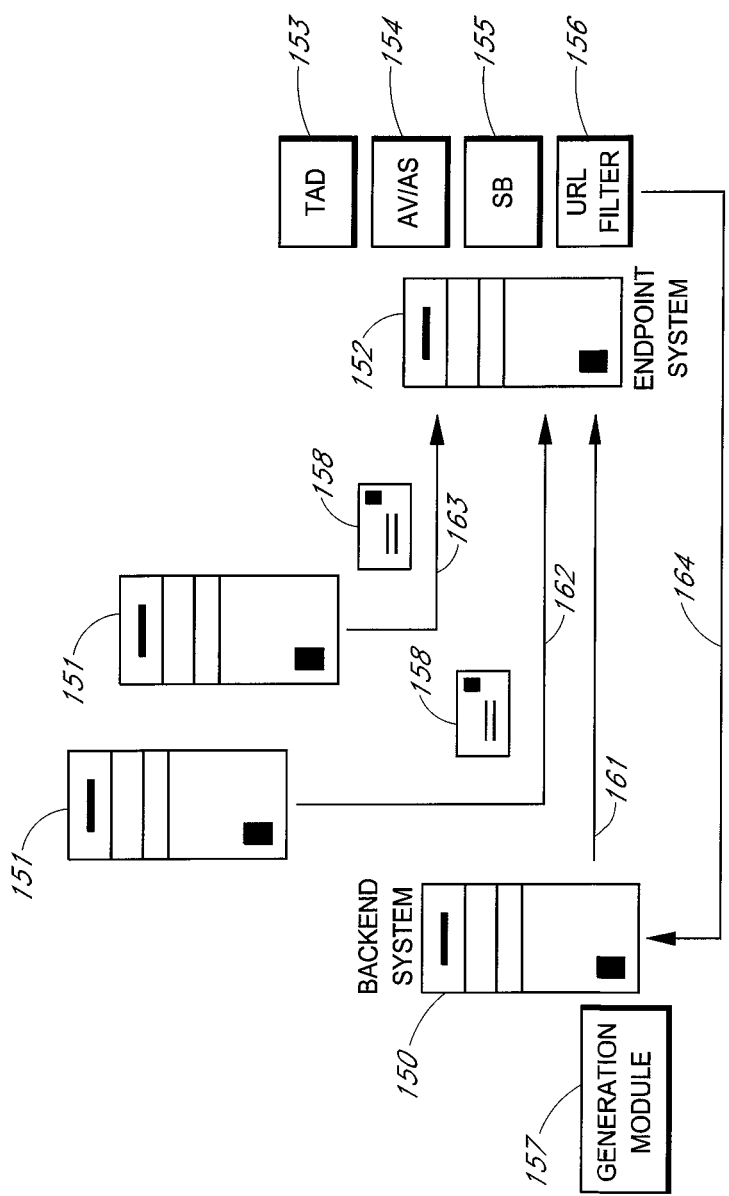
FIG. 2 shows a system for detecting targeted email attacks in accordance with an embodiment of the present invention.

FIG. 2 shows a system for detecting targeted email attacks in accordance with an embodiment of the present invention. In the example of FIG. 2, the system includes a backend computer system (also referred to herein as a "backend system 150") and one or more endpoint computer systems (also referred to herein as an "endpoint system 152"). Only one endpoint system 152 is shown in FIG. 2 for ease of illustration. In a typical deployment scenario, there is a plurality of endpoint systems 152 that works in conjunction with one or more backend systems 150 to detect targeted email attacks.

An endpoint system 152 comprises one or more computers that detect a targeted email attack. An endpoint system 152 may be a user computer, such as a desktop computer or a laptop computer, for example. An endpoint system 152 may also be a server computer, such as a gateway, email server, or other centralized computer that receives emails for other computers in a private computer network. An endpoint system 152 may receive one or more emails (labeled as 158; see arrows 162 and 163) from one or more email systems 151 (e.g., email server, mail transfer agent) and determine whether or not an email is an "abnormal email," which in this disclosure refers to an email that is part of a targeted email attack. A legitimate, non-malicious email is also referred to herein as a "normal email."

In the example of FIG. 2, an endpoint system 152 comprises a targeted attack detector (TAD) 153, an antivirus software and/or anti-spam software (AV/AS) 154, a sandbox module 155, and a URL filter 156. In one embodiment, the aforementioned components of the endpoint system 152 are implemented in software, i.e., computer-readable program code. Generally speaking, software components may alternatively be implemented in hardware (e.g., application specific integrated circuit (ASIC), field programmable gate array (FPGA), programmable logic) or combination of hardware and software (e.g., hardware that operates with a software driver and/or firmware components).

In one embodiment, the targeted attack detector 153 is configured to receive an email, pre-process (e.g., by scanning and parsing) the email to identify features indicative of a targeted email attack and to identify the interflow characteristics (e.g., sender, recipients, email identifier) of the email, check the features of the email against feature combinations of abnormal and normal emails, check the interflow shape formed by the email with other emails against interflow shapes of abnormal and normal emails, determine whether the email is an abnormal email or a normal email based on the aforementioned checking of the email, and generate a report on whether the email is an abnormal email or a normal email.

The antivirus and/or anti-spam module 154 is configured to check an email for computer viruses and/or to determine whether or not the email is spam, i.e., an unsolicited email. The module 154 may comprise conventional or commercially-available antivirus and/or anti-spam software. FIG. 2 shows the antivirus and the anti-spam functionality being provided by the same module 154. As can be appreciated, the antivirus and anti-spam functionality may be provided by separate modules.

The sandbox module 155 may comprise a conventional sandbox module configured to provide an isolated and controlled execution environment (also referred to as a "sandbox") for suspect program code. The sandbox module 155 may be implemented as a virtual machine, for example. An email attachment may be safely "detonated", i.e., executed, in the sandbox for observation to detect if the attachment performs malicious actions, such as accessing registries, deleting files, forwarding files, opening backdoors, etc., without compromising the endpoint system 152. An email that has been evaluated by the targeted attack detector 153 may be passed to the sandbox module 155 for verification. For example, an email that is deemed normal or abnormal by the targeted attack detector 153 may be executed in the sandbox to verify if the email is indeed normal or abnormal. The result of the verification performed by the sandbox module 155 may be provided back to the backend server 150 as feedback for tuning or optimizing the targeted attack detector 153 (see arrow 164).

The URL filter 156 may comprise a conventional URL filter. The URL filter 156 may be configured to evaluate one or more URLs that are included in an email (e.g., in the message body and/or Simple Mail Transfer Protocol (SMTP) header), block URLs that are in a blacklist of URLs, allow URLs that are in a whitelist of URLs, and/or determine a reputation of the URLs. For example, the URL filter 156 may consult a local or remote reputation database containing reputations of known URLs to determine if a URL extracted from an email has a good (i.e., non-malicious), bad (i.e., malicious), or unknown reputation. The URL filter 156 may be configured to block emails that contain one or more URLs with a bad reputation.

One or more URLs extracted from an email that has been evaluated by the targeted attack detector 153 may be passed to the URL filter 156 for verification. For example, a URL from an email that is deemed normal or abnormal by the targeted attack detector 153 may be provided to the URL filter 156 to determine if the email is indeed normal (e.g., the URL has a good reputation) or abnormal (e.g., the URL has a bad reputation). The URL filter 156 may provide its evaluation results to the backend server 150 as feedback for tuning or optimizing the targeted attack detector 153 (see arrow 164).

The backend server 150 may comprise one or more computers for generating the targeted attack detector 153 and for providing the targeted attack detector 153 to subscribing computers, such as the endpoint system 152 (see arrow 161). The backend system 150 may include a targeted attack detector generation module 157. In one embodiment, the generation module 157 may comprise one or more software modules for collecting training sets of known abnormal and normal emails, extracting features from and interflow characteristics of emails in the training sets of known abnormal and normal emails, assigning weights to abnormal and normal features, generating feature combinations, generating a traverse tree, and generating interflow shapes of known abnormal and normal emails. The generation module 157 may comprise scripts, graphing software, SMTP analyzer, and other software modules for generating or facilitating generation of the targeted attack detector 153.

Figure 3:
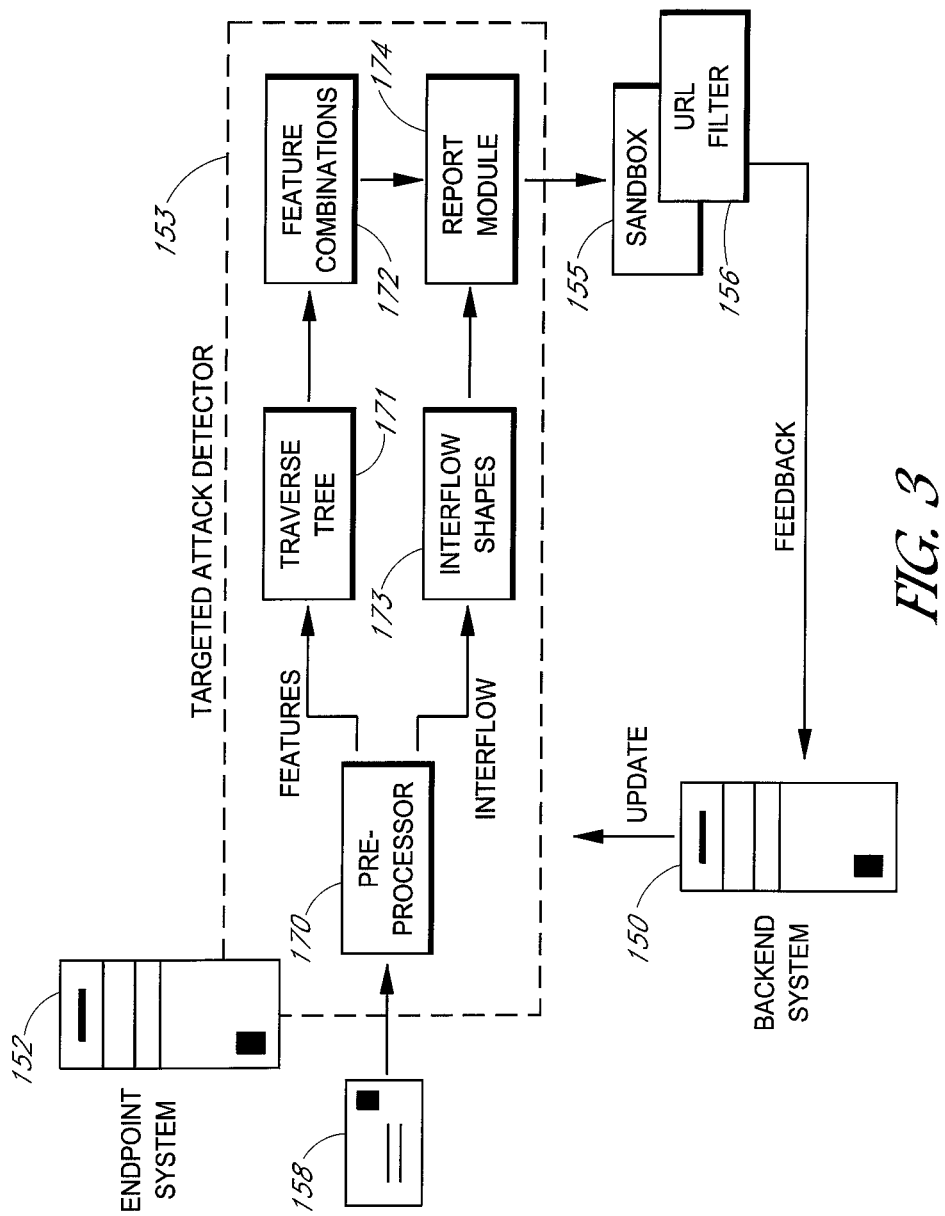
FIG. 3 schematically shows a targeted attack detector in accordance with an embodiment of the present invention.

FIG. 3 schematically shows the targeted attack detector 153 in accordance with an embodiment of the present invention. In the example of FIG. 3, the targeted attack detector 153 comprises a pre-processor 170, a traverse tree 171, feature combinations 172, interflow shapes 173, and a report module 174. The targeted attack detector 153 is shown in FIG. 3 as deployed and running in an endpoint system 152.

In the example of FIG. 3, an email (labeled as 158) is received by the endpoint system 152. There, the pre-processor 170 of the targeted attack detector 153 scans the email to look for features that may be used to evaluate the email for targeted email attack and to determine the interflow shape formed by the email with other emails from the same sender. In one embodiment, the preprocessor 170 extracts or identifies from the email features that are indicative of abnormal and normal emails. The features may be those included in the feature combinations 172. The features extracted or identified from the email may include abnormal features, which are features that are indicative of targeted email attacks, such as particular sender identifiers (e.g., sender address of known targeted email attacks), particular recipient identifiers (e.g., recipient address of known targeted email attacks), words and phrases that are known to be used in targeted email attacks, information indicative of multiple mail relays, header information (to identify missing required headers), etc. The features may also be normal features, which are features that are indicative of normal emails, such as authenticated DKIM (DomainKeys Identified Mail) header, SPF (Sender Policy Framework) of routing MTAs (Mail Transfer Agents) etc.

The targeted attack detector 153 includes a plurality of feature combinations 172. The plurality of feature combinations 172 may include feature combinations for detecting abnormal emails and feature combinations for detecting normal emails. In one embodiment, each feature combination 172 comprises one or more features that when all found in the same email indicates that the email is an abnormal or normal email. For example, a feature combination 172 for detecting an abnormal email has one or more abnormal features that when all found in the same email indicates that the email is an abnormal email. As another example, a feature combination 172 for detecting a normal email has one or more features that when all found in the same email indicates that the email is a normal email.

Features identified as being in the email are extracted and input into the traverse tree 171. In one embodiment, each feature included in the feature combinations 172 is represented as a node in the traverse tree 171. The nodes of the traverse tree 171 are arranged in different levels, with each level representing a scanning priority. The node at the highest level (top of the tree) has the highest scanning priority and the nodes at the lowest level (bottom of the tree) have the lowest scanning priority. High priority nodes may represent features that occur frequently in abnormal or normal email, while low priority nodes may represent features that occur less frequently or take time to look up. Traversing the traverse tree 171 may involve matching features extracted from the email with the nodes of the traverse tree from the top of the tree to the bottom of the tree. By arranging features in hierarchical fashion, the traverse tree 171 speeds up the matching of the feature combinations 172 with features extracted from the email. An abnormal email may be detected by traversing the traverse tree 171 with abnormal features extracted from the email and finding the abnormal features in at least one feature combination 172 for detecting an abnormal email. Similarly a normal email may be detected by traversing the traverse tree 171 with normal features extracted from the email and finding the normal features in at least one feature combination 172 for detecting a normal email.

The pre-processor 170 may also scan the email to identify and extract the interflow characteristics of the email, such as the identity of the sender of the email, the identity of the one or more recipients of the email, and contents of the email. The sender of the email may be identified by email address, prepended X-Headers (e.g. X-Originating-IP), etc. The recipients of the email may be identified by email address, in the "for" field of "Received" Headers, etc.

The pre-processor 170 may generate an email identifier for the email. The email identifier may comprise characters that represent the contents of the email, such as an attachment, URL links, text hash of message body of the email, and so on. The email identifier may be a text-hash, tag-hash, locality sensitive hash, or other code or representation of the email that may be employed to determine similarity of emails. The email identifier of the email may be compared to an email identifier of another email to determine whether the two emails are the same or similar, i.e., whether the two emails have the same or similar contents.

Emails received from the same sender may form an identifiable interflow shape, which may include the identity of the sender, the identity of the recipients, and contents of the email (e.g., as represented by email identifier). In one embodiment, an interflow shape 173 comprises the connection pattern formed by a sender sending emails to one or more different recipients. The plurality of interflow shapes 173 may comprise interflow shapes 173 formed by known abnormal emails and interflow shapes 173 formed by known normal emails. When the interflow characteristics of the email combined with interflow characteristics of other emails form an interflow shape that matches an interflow shape 173 of known abnormal emails, the email may be deemed to be an abnormal email. Similarly, the email may be deemed to be a normal email when the interflow characteristics of the email combined with interflow characteristics of other emails form an interflow shape that matches an interflow shape 173 of known normal emails.

In one embodiment, the targeted attack detector 153 further includes a report module 174 for generating a report of the evaluations performed on the email. For example, the report module 174 may generate a report indicating an email is an abnormal or normal email and the reasons for its conclusion. For example, the report module 174 may indicate that the email is found to be an abnormal email because it has all the features of a feature combination 172 for detecting an abnormal email. As another example, the report module 174 may indicate that the email is an abnormal email because it fits into an interflow shape 173 of abnormal emails. The email may be further evaluated by the sandbox module 155 and the URL filter 156 to verify the conclusions of the targeted attack detector 153. The results of the URL filtering and sandboxing of the email along with information form the targeted attack detector 153 (e.g., evaluation results, data collected) may be provided to the backend system 150 as feedback for optimization of the targeted attack detector 153. This allows the backend system 150 to update the targeted attack detector 153 with the latest information (e.g., latest interflow shapes 173 and feature combinations 172) for detecting targeted email attacks.

Figure 4:
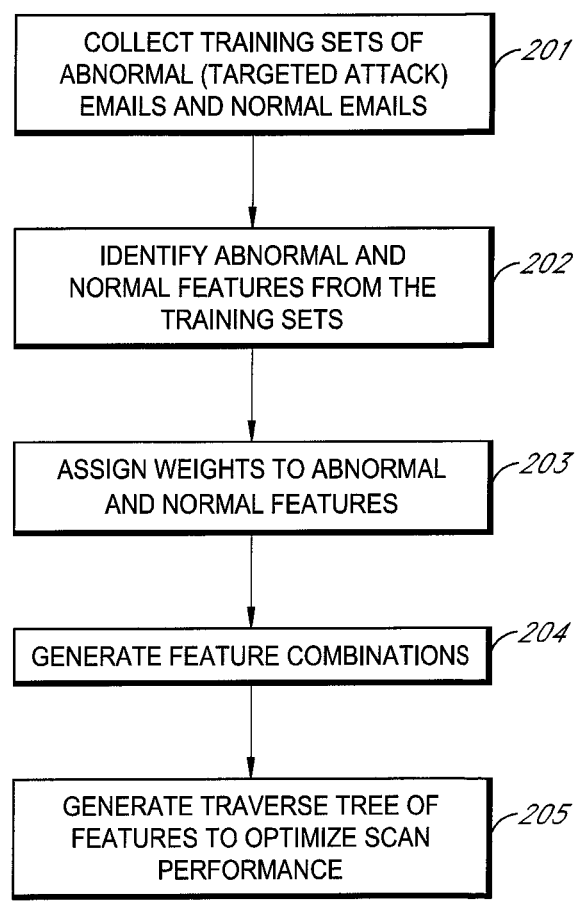
FIG. 4 shows a flow diagram of a method of generating feature combinations for detecting targeted email attacks in accordance with an embodiment of the present invention.

FIG. 4 shows a flow diagram of a method of generating feature combinations (e.g., feature combinations 172) for detecting targeted email attacks in accordance with an embodiment of the present invention. In the example of FIG. 4, steps 201-204 generate the feature combinations and the step 205 is an optional step to generate a traverse tree. The method of FIG. 4 may be performed in the backend system 150 using the targeted attack detector generation module 157, for example.

In the example of FIG. 4, training sets of abnormal and normal emails are collected (step 201). The training set of abnormal emails may comprise samples of emails that are known to be part of targeted email attacks, while the training set of normal emails may comprise samples of emails that are known to be normal.

Abnormal features indicative of an abnormal email may be identified based on who sent the email (e.g., identity of a sender that pretends to be from a particular organization but is actually not), how the email was relayed, when the email was received or how long it took to receive the email, where the email came from (e.g., reputation of the sender IP address or autonomous system number), and what the email contains (e.g., involves critical information, such as a password, financial information), to name a few examples. For each of the sample abnormal emails, information included in the email, such as sender identity, etc., may be verified to find inconsistencies, abnormal characteristics, and behaviors that may be used as features in identifying other targeted email attacks (step 202). A similar procedure may be performed to identify normal features that are included in emails in the training set of normal emails. That is, features that are indicative of normal emails may be identified from emails in the training set of normal emails.

Numerical weights are assigned to the abnormal and normal features identified from the training sets of emails (step 203). A numerical weight indicates the reliability or significance of a feature in identifying an abnormal (in the case of abnormal features) or normal (in the case of normal features) email. For example, a feature that is highly indicative of an abnormal email may be assigned a weight that is higher than that of another abnormal email that is not as indicative. The numerical weights may be assigned using any suitable conventional algorithm, such as by support vector machine, random forest, or neural networks, without detracting from the merits of the present invention.

The weighted features are combined into feature combinations that may be employed to identify abnormal and normal emails (step 204). For example, a weighted abnormal feature "Feature1" may be correlated with another weighted abnormal feature "Feature3" to create a feature combination "(Feature1, Feature3)" that represents an abnormal email. In this example, when Feature1 and Feature3 are both found in the same email, that email may be deemed to be an abnormal email. As another example, a weighted normal feature "Feature7" may be correlated with another weighted normal feature "Feature8" to create a feature combination "(Feature7, Feature8)" that represents a normal email. Accordingly, when Feature7 and Feature8 are both found in the same email, that email may be deemed to be a normal email. Features may be correlated using a greedy algorithm, coverage rate (maximum set cover problem) algorithm, and other correlation algorithms without detracting from the merits of the present invention.

To classify an email as an abnormal or normal email, the email may be scanned for abnormal and normal features that are included in the feature combinations of normal and abnormal emails. The scanning process may take some time depending on the number of features to be searched. To optimize the performance of the scanning process, a traverse tree for scanning an email for features may optionally be generated (step 205).

Figure 5:
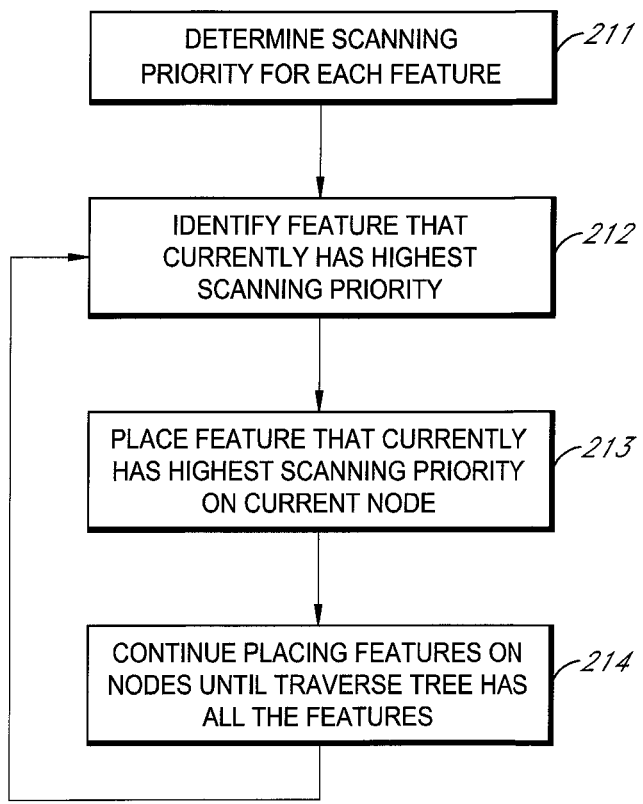
FIG. 5 shows a flow diagram of a method of generating a traverse tree in accordance with an embodiment of the present invention.

FIG. 5 shows a flow diagram of a method of generating a traverse tree in accordance with an embodiment of the present invention. The traverse tree may be for detecting abnormal emails. As can be appreciated, the same method may be used to generate a traverse tree for detecting normal emails.

In the example of FIG. 5, the scanning priority of each feature in the feature combinations is determined (step 211). The scanning priority indicates which feature is to be looked up first and may be based on the feature's number of appearance in the tree, execution lead time, occurrence frequency in real world samples, and weight, for example. A traverse tree may be constructed from top (i.e., highest scanning priority) to bottom (i.e., lowest scanning priority), with each feature being represented by a node in the traverse tree.

In the example of FIG. 5, the feature that currently has the highest scanning priority is identified (step 212) and placed on the current node of the tree (step 213). The current node may be at the top of the tree, a bottom node, or some intervening node where a feature is yet to be placed. After the current node is populated with the feature, the next current highest scanning priority feature is identified and placed on the next current node and so on until all features of the feature combinations are placed on the traverse tree (step 214).

FIG. 6 shows a particular example of a traverse tree in accordance with an embodiment of the present invention. The example of FIG. 6 shows a traverse tree for five features, namely Feature1, Feature2, Feature3, Feature4, and Feature5. Feature1 has the highest scanning priority at priority 3, Feature2 and Feature3 have the next highest scanning priority at priority 2, and Feature4 and Feature5 have the next highest scanning priority at priority 1. These features are abnormal features in the example of FIG. 6. As can be appreciated, these features may also be normal features for a traverse tree of feature combinations for detecting normal emails.

In the example of FIG. 6, the traverse tree is a binary tree where each node has exactly one parent node and two child nodes. The traverse tree works like a decision tree where each node provides a YES (left-child) or NO (right-child) decision for subsequent traverse-path. When a traverse reaches a leaf-node, the decision of the leaf-node indicates whether a particular feature combination is "detected" (to the left) or "undetected" (to the right). A traverse tree is described herein as an example. As can be appreciated, feature combinations may be represented by a decision tree, finite state machine, or other traverse mechanism or data structure.

In the example of FIG. 6, a feature is bounded by a box when that feature has already been placed on the tree and is thus no longer being considered for placement to a node. Features in a feature combination that has a strikethrough are not being considered at that time. For example, Feature1 has already been placed on a node and is thus bounded by a box in row 221. On the same row 221, the feature combination (Feature2, Feature5) is not being considered until the left sub-tree of Feature 1 (which has already been placed on a node) has been completely constructed because the left sub-tree of Feature1 provides a YES (left-child) decision for subsequent traverse-path and Feature2 and Feature5 are not yet possible to be detected being on the left sub-tree of Feature1.

In the example of FIG. 6, Feature1 currently has the highest scanning priority and placed on the current node of the tree (row 220). Next, Feature3 is deemed to have the current highest scanning priority on the left sub-tree of Feature1 because it forms a feature combination with Feature1. Feature3 is thus placed on a node connected to the left of the node of Feature1 (row 221). Next, Feature4 (which has the next highest scanning priority in the previous row because it also forms a feature combination with Feature1) is connected to the last node (Feature3) and to the right because it does not form a feature combination with Feature3 (row 222). Therefore, the traverse tree indicates scanning an email first for Feature1, then for Feature3 (which forms a feature combination with Feature1) if feature 1 is detected, and then for Feature 4 (which also forms a feature combination with Feature1) if feature 3 isn't detected.

The remaining features, which are Feature2 and Feature5 in the example of FIG. 6, are then placed on the traverse tree. Feature2 is connected to the node of Feature1 and to the right because it does not form a feature combination with Feature1 (row 223). The last feature, Feature 5, is connected to the node of Feature2 and to the left because it forms a feature combination with Feature2. Traversing the tree follow the decision tree traversal, which may go through the following traverse order:

1. F1(detected)=>F3 (detected)
2. F1(detected)=>F3(undetected)=>F4(detected/undetected)
3. F1(undetected)=>F2(undetected)
4. F1(undetected)=>F2(detected)=>F5(detected/undetected)

It is to be noted that in the above traverse order, the final detection is reflected by the detection at the last node.

Figure 7:
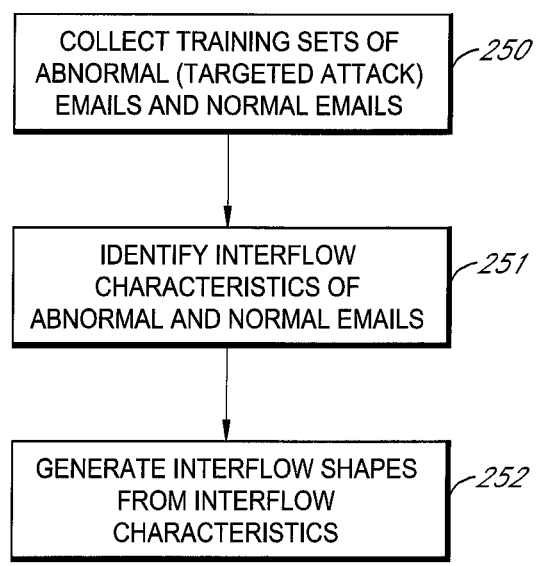
FIG. 7 shows a flow diagram of a method of generating interflow shapes for detecting targeted email attacks in accordance with an embodiment of the present invention.

FIG. 7 shows a flow diagram of a method of generating interflow shapes (e.g., interflow shapes 173) for detecting targeted email attacks in accordance with an embodiment of the present invention. The method of FIG. 7 may be performed in the backend system 150 using the targeted attack detector generation module 157, for example.

In the example of FIG. 7, training sets of abnormal and normal emails are collected (step 250). A training set of abnormal emails may comprise samples of emails that are known to be part of targeted email attacks, while a training set of normal emails may comprise samples of emails that are known to be normal.

Interflow characteristics of emails in the training set of abnormal and normal emails are identified (step 251). The interflow characteristics may include the sender, recipients, and email identifier of the emails.

Interflow shapes are generated from the identified interflow characteristics (step 252). An interflow shape for detecting an abnormal email may be generated from interflow characteristics of abnormal emails in the training set, and an interflow shape for detecting a normal email may be generated from interflow characteristics of normal emails in the training set. In one embodiment, an interflow shape is the connection of a sender sending an email (e.g., as identified by its email identifier) to one or more recipients.

Figure 8:
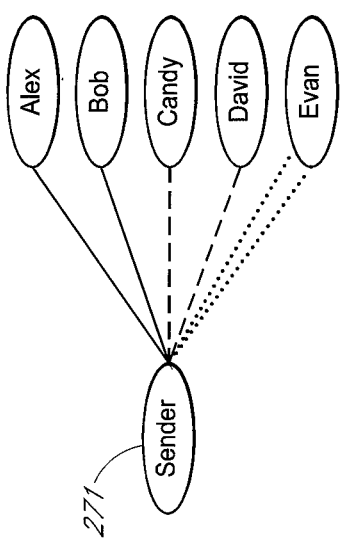
FIG. 8 shows example interflow characteristics of emails.

FIG. 8 shows a high level example interflow characteristics of emails sent by the same sender 271 to different recipients. In the example of FIG. 8, the sender 271 sent emails to recipients "Alex", "Bob", "Candy", "David", and "Evan." The sender 271 and the recipients may be identified by their respective email addresses. In the example of FIG. 8, the Message ID (e.g., Msg 1, Msg 2, etc.) indicates a message identifier of a separately sent email. In particular, the sender 271 sent a single email (Msg 1) with both Alex and Bob as recipients. The sender 271 also sent two separate emails (Msg 2 and Msg 3) with the same email identifier (i.e., the contents of the two separate emails are the same or similar) to Candy and David. The sender 271 also sent two similar but separately sent emails (Msg 4 and Msg 5) to Evan.

Figure 9:
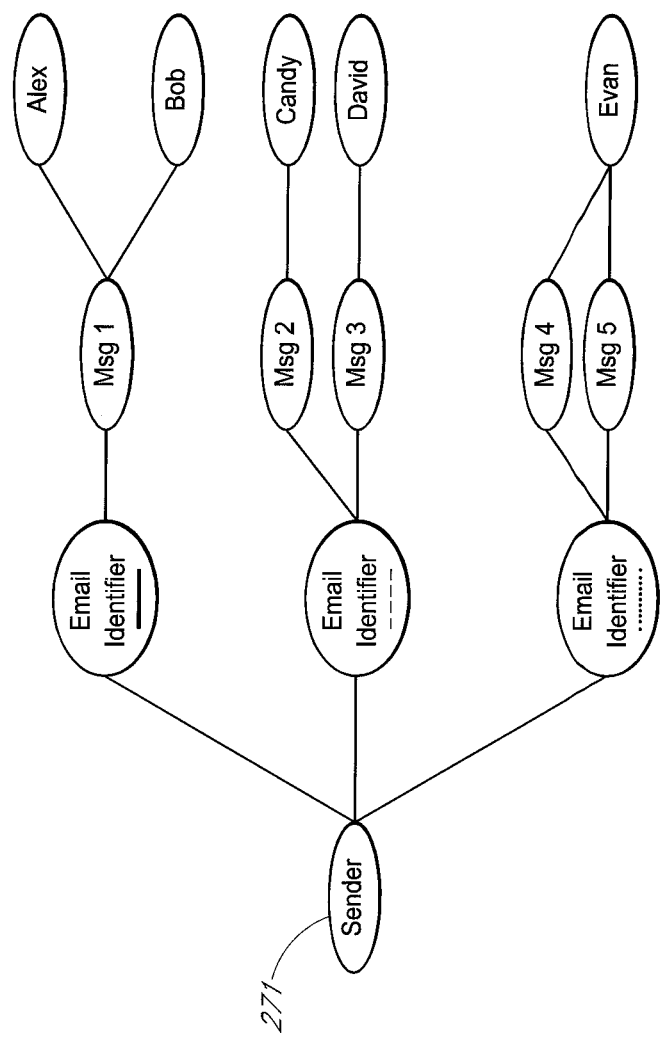
FIG. 9 shows interflow shapes for the interflow characteristics of FIG. 8 in accordance with an embodiment of the present invention.

The interflow characteristics of the emails of FIG. 8 may also be represented as a 4-level interflow shape as shown in FIG. 9. The example of FIG. 9 shows three readily identifiable interflow shapes, with a first interflow shape representing the sender 271 sending a first email content (as identified by the email identifier) to both Alex and Bob in the same email (Msg 1), a second interflow shape representing the sender 271 sending a second email content in two separate emails (Msg 2 and Msg 3) to Candy and David individually, and a third interflow shape representing the sender 271 sending a third email content in two separate emails (Msg 4 and Msg 5) to Evan.

In general, the sending pattern of an attacker may be identified from the training set of abnormal emails. The sending pattern of a sender in a target email attack may be represented as an interflow shape that connects the particular sender to different recipients of emails that have the same or similar content. The same is true for the sending pattern of a particular sender that sends normal emails.

Figure 10:
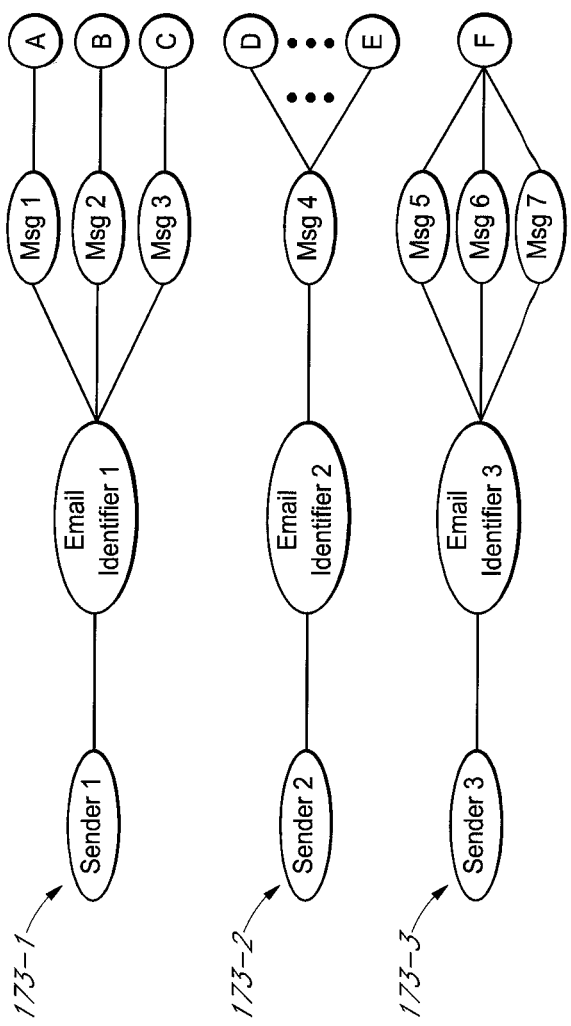
FIG. 10 shows example interflow shapes in accordance with an embodiment of the present invention.

FIG. 10 shows example interflow shapes 173 (i.e., 173-1, 173-2, 173-3) in accordance with an embodiment of the present invention. The example of FIG. 10 includes senders Sender 1, Sender 2, and Sender 3 and recipients A, B, C, D, E, F, etc. The email identifiers of emails are labeled as "Email Identifier 1", "Email Identifier 2", and "Email Identifier 3"; the message identifiers are labeled as "Msg 1", "Msg 2", "Msg 3", "Msg 4", "Msg 5", "Msg 6", and "Msg 7". For example, referring to interflow shape 173-1, Sender 1 sent separate emails with the same Email Identifier 1 to recipients A, B, and C. This is shown by the same Email Identifier 1 with different message identifiers Msg 1, Msg 2, and Msg 3. That is, Msg 1, Msg 2, and Msg 3 are separately sent emails that have the same or similar content.

As another example, referring to interflow shape 173-2, Sender 2 sent an email with the Email Identifier 2 to recipients D and E, e.g., by having both recipients D and E in the "to" field of the email. This is shown by the same message identifier Msg 4 to both recipients D and E.

Yet another example, referring to interflow shape 173-3, Sender 3 sent the email with the Email Identifier 3 to the same recipient F three different times, as indicated by the different message identifiers Msg 5, Msg 6, and Msg 7 for the same Email Identifier 3 going to recipient F.

The interflow shapes 173 may represent targeted email attack patterns revealed from the training sets of abnormal emails. For example, the interflow shape 173-1 may represent an attacker (i.e. Sender 1) that used a free email service account to send three different emails (Msg 1, Msg 2, and Msg 3) with the same or similar content (Email Identifier 1) to focus on three key employees (recipients A, B, and C) of the target company. In order to appear legitimate, the attacker sent the same content in three separate emails to the three key employees. The mail subject and/or other aspects of the email may be personalized (hence targeted), but the rest of the message content is either identical or highly similar, leading to the same Email Identifier 1 for the email. The interflow shapes 173 may be consulted to identify a new targeted email attack, such as when some sender sends emails to some recipients and form a similar shape to that of the interflow shapes 173. For example, when the Sender 1 makes minor changes to the contents of the email and sends the contents in an email campaign that matches the interflow shape 173-1, the targeted email attack will be detected. As another example, when another sender, say "sender X", sends the same email separately to recipients, which means the sent emails have the same email identifier X, the emails also form an interflow shape that matches the interflow shape 173-1, thereby detecting the targeted email attack.

The procedure for generating interflow shapes 173 of normal emails is similar to the above-described procedure for generating interflow shapes 173 of abnormal emails. Interflow shapes of spam and other emails may also be generated the same way.

Unlike other targeted attack detection that involves use of relatively complex models, such as those based on support vector machines (SVM), Random Forest, and Neural Networks, the use of feature combinations and interflow shapes allow for generation of reports that are detailed yet relatively easy to comprehend. A report generated by the report module 174 may thus include particulars of why an email is deemed to be an abnormal email. This is illustrated in FIG. 11, which shows an example report that may be generated by the report module 174. In the example of FIG. 11, an abnormal email is detected with a description of the email characteristics (e.g., abnormal feature combinations, interflow characteristics) and details of the characteristics.

Figure 12:
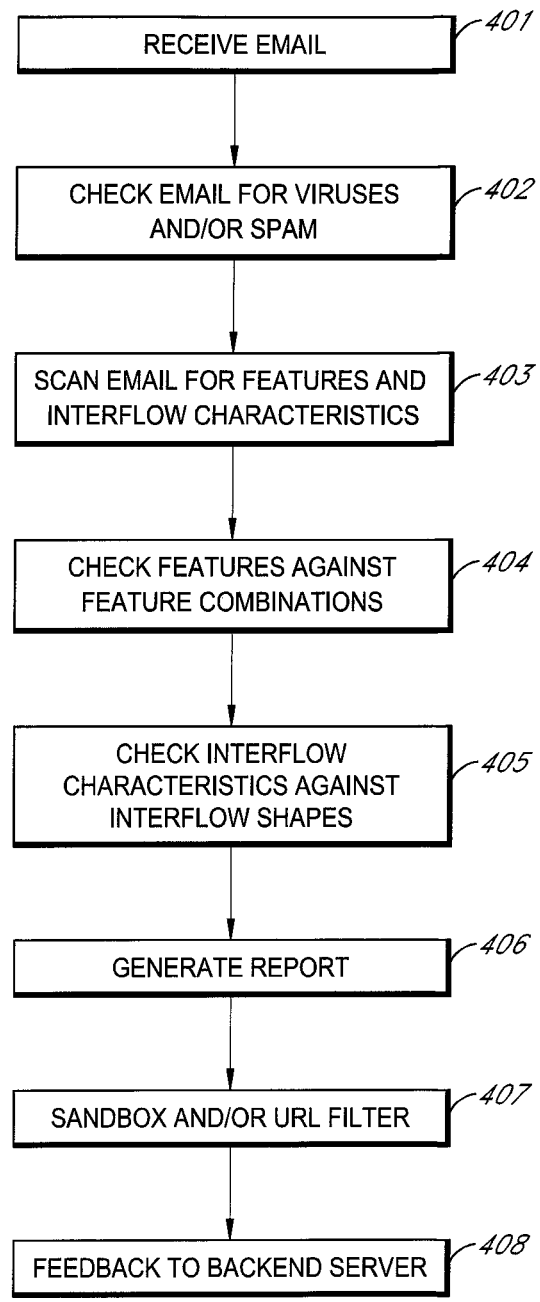
FIG. 12 shows a flow diagram of a method of detecting a targeted email attack in accordance with an embodiment of the present invention.

FIG. 12 shows a flow diagram of a method of detecting a targeted email attack in accordance with an embodiment of the present invention. The method of FIG. 12 is explained using previously-described components for ease of illustration. As can be appreciated, other components may also be employed without detracting from the merits of the present invention. In one embodiment, the method of FIG. 12 is performed by an endpoint computer system.

In the example of FIG. 12, an email is received in an endpoint computer system (step 401). The email is checked for viruses using an antivirus module and for spam using an anti-spam module (step 402). A targeted attack detector scans the email for features indicated in feature combinations and for interflow characteristics (step 403). The targeted attack detector checks the features against abnormal feature combinations to determine if the email is an abnormal email and against normal feature combinations to determine if the email is a normal email (step 404). The interflow shape formed by the email with other emails is checked against interflow shapes of known targeted email attacks and interflow shapes of known normal emails (step 405). The contents of the email may be transformed to a hash to generate an email identifier of the email. As an example, using the interflow characteristics of the email, the targeted attack detector checks if the email and other emails sent by the same sender form an interflow shape that matches that of a known targeted email attack. If so, the email may be deemed to be an abnormal email. Similarly, the email may be deemed to be a normal email when the email and other emails sent by the same sender form an interflow shape that matches that of a known normal email.

The checking for features against feature combinations of abnormal and normal feature combinations (as in step 404) and the checking of the interflow shape formed by the email with other emails against interflow shapes of known targeted email attacks or of known normal emails (as in step 405) may both be performed. In other embodiments, only one or the other of the checks is performed to detect targeted email attacks or normal emails.

In one embodiment, to prevent false positives, an email is deemed to be an abnormal email only when the email is found to be an abnormal email and is not found to be a normal email. Similarly, an email may be deemed to be a normal email only when the email is found to be a normal email and not found to be an abnormal email. In other words, checking an email for targeted email attacks may involve checking features of the email against both normal and abnormal feature combinations and/or checking interflow shape formed by the email against both normal and abnormal interflow shapes.

The targeted attack detector may generate a report that explains the findings of the targeted attack detector, such as whether an email is found to be an abnormal email and the reasons why (step 406). The email may be subjected to sandboxing and/or URL filtering to verify the findings of the targeted attack detector (step 407). The results of the evaluations performed by sandboxing and/or URL filtering may be provided to a backend system for tuning or optimizing the targeted attack detector (step 408).

Methods and systems for detecting targeted email attacks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting targeted email attacks, the method comprising:

receiving an email sent by a sender to a recipient in a computer system;

scanning the email to identify interflow characteristics of the email, the interflow characteristics of the email comprising an identity of the sender, an identity of the recipient, and an identifier of the email;

finding the email to be an abnormal email that is part of a targeted email attack when the email and other emails sent by the sender to other recipients in the computer system form a first interflow shape that matches at least one interflow shape in a plurality of interflow shapes of known targeted email attacks, wherein the first interflow shape indicates a connection of the sender sending the email to the recipient and sending the other emails to the other recipients, and each interflow shape in the plurality of interflow shapes indicates a connection of senders sending emails to target recipients to perpetrate the known targeted email attacks;

finding the email to be a normal email when the email and the other emails sent by the sender form the first interflow shape that matches at least one interflow shape in a plurality of interflow shapes of known normal emails; and deeming the email to be an abnormal email only when the email is found to be an abnormal email and the email is not found to be a normal email.

2. A system comprising:

an endpoint computer system that receives an email sent by a sender to a recipient in a computer system, scans the email to identify interflow characteristics of the email, and finds the email to be an abnormal email that is part of a targeted email attack when the email and other emails sent by the sender to other recipients in the computer system form a first interflow shape that matches at least one interflow shape in a plurality of interflow shapes of known targeted email attacks, wherein the first interflow shape indicates a connection of the sender sending the email to the recipient and sending the other emails to the other recipients, and each interflow shape in the plurality of interflow shapes indicates a connection of senders sending emails to target recipients to perpetrate the known targeted email attacks, wherein the endpoint computer system finds the email to be a normal email when the email and the other emails sent by the sender form the first interflow shape that matches at least one interflow shape in a plurality of interflow shapes of known normal emails, and wherein the endpoint computer system deems the email to be an abnormal email only when the email is found to be an abnormal email and the email is not found to be a normal email.

* * * * *